United States Patent
Kagan et al.

(10) Patent No.: US 7,929,539 B2
(45) Date of Patent: Apr. 19, 2011

(54) MULTIPLE QUEUE PAIR ACCESS WITH A SINGLE DOORBELL

(75) Inventors: Michael Kagan, Zichron Yaakov (IL); Gil Bloch, Kiryat Ata (IL); Diego A. Crupnicoff, Haifa (IL); Margarita Schnitman, Netivot (IL); Dafna Levenvirth, Neit Izhak (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 12/360,119

(22) Filed: Jan. 27, 2009

(65) Prior Publication Data
US 2009/0129392 A1 May 21, 2009

Related U.S. Application Data

(63) Continuation of application No. 09/991,692, filed on Nov. 26, 2001, now Pat. No. 7,543,290.

(60) Provisional application No. 60/283,108, filed on Apr. 11, 2001.

(51) Int. Cl.
*H04L 12/28* (2006.01)

(52) U.S. Cl. ........ 370/392; 370/463; 370/464; 370/465; 370/466; 709/200; 709/217; 709/249; 710/26; 710/104; 710/105; 710/107; 711/147; 711/148; 711/168

(58) Field of Classification Search .................. 370/463, 370/464, 465, 466; 709/200, 217, 249; 710/26, 710/104, 105, 107, 243; 711/147, 148, 168
See application file for complete search history.

(56) References Cited

U.S. PATENT DOCUMENTS

| | | | |
|---|---|---|---|
| 6,353,869 B1 * | 3/2002 | Ofer et al. ..................... 710/200 |
| 6,594,712 B1 * | 7/2003 | Pettey et al. .................... 710/22 |
| 6,598,144 B1 * | 7/2003 | Bailey et al. .................. 711/203 |
| 6,697,927 B2 * | 2/2004 | Bonola ......................... 711/168 |
| 6,778,548 B1 * | 8/2004 | Burton et al. ................. 370/429 |
| 6,789,143 B2 * | 9/2004 | Craddock et al. ............... 710/54 |
| 6,895,590 B2 * | 5/2005 | Yadav .......................... 719/328 |
| 6,917,987 B2 * | 7/2005 | Parthasarathy et al. ........ 709/249 |
| 6,948,004 B2 * | 9/2005 | Gasbarro et al. .............. 709/250 |
| 7,010,633 B2 * | 3/2006 | Arndt et al. ................... 710/243 |
| 7,401,126 B2 * | 7/2008 | Pekkala et al. ................ 709/217 |
| 2002/0071450 A1 * | 6/2002 | Gasbarro et al. ............. 370/463 |
| 2002/0073257 A1 * | 6/2002 | Beukema et al. ............. 710/105 |
| 2002/0141424 A1 * | 10/2002 | Gasbarro et al. ............. 370/412 |

* cited by examiner

*Primary Examiner* — Ayar R Sheikh
*Assistant Examiner* — Andrew C Lee
(74) *Attorney, Agent, or Firm* — Mark M. Friedman

(57) ABSTRACT

A method for controlling access by processes running on a host device to a communication network includes assigning to each of the processes a respective doorbell address on a network interface adapter that couples the host device to the network and allocating instances of a communication service on the network, to be provided via the adapter, to the processes. Upon receiving a request submitted by a given one of the processes to its respective doorbell address to access one of the allocated service instances, the adapter conveys the data over the network using the specified instance of the service, subject to verifying, based on the doorbell address to which the request was submitted, that the specified instance was allocated to the given process.

23 Claims, 2 Drawing Sheets

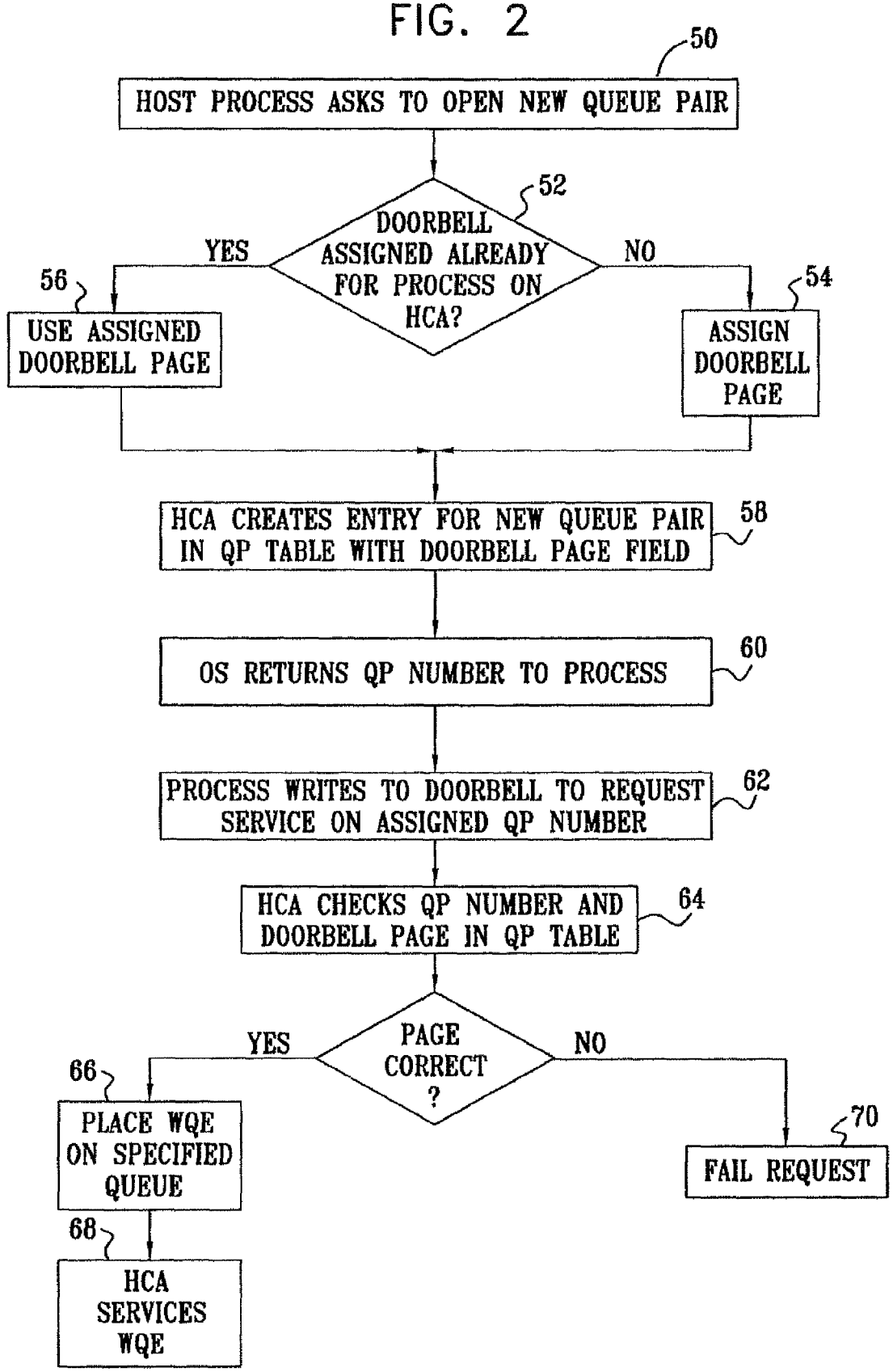

MULTIPLE QUEUE PAIR ACCESS WITH A SINGLE DOORBELL

CROSS REFERENCE TO RELATED APPLICATIONS

This application is a continuation of Ser. No. 09/991,692, filed Nov. 26, 2001, now US2002-0165899, and also claims the benefit of U.S. Provisional Application No. 60/283,108 filed Apr. 11, 2001, both of which are incorporated herein by reference.

FIELD OF THE INVENTION

The present invention relates generally to digital network communications, and specifically to controlling access to network communication services by a host processor.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the *InfiniBand Architecture Specification*, Release 1.0 (October, 2000), which is incorporated herein by reference. This document is available from the InfiniBand Trade Association at www.infinibandta.org.

A host processors (or host) connects to the IB network via a network adapter, which is referred to in IB parlance as a host channel adapter (HCA). When an IB "consumer," such as an application process on the host, needs to open communications with some other entity via the IB network, it asks the HCA to provide the necessary transport service resources by allocating a queue pair (QP) for its use. Each QP is configured with a context that includes information such as the destination address (referred to as the local identifier, or LID), service type, and negotiated operating limits. Communication over the network takes place between a source QP and a destination QP, so that the QP serves as a sort of virtual communication port for the consumer. To send and receive communications over the network, the consumer initiates work requests (WRs), which causes work items, called work queue elements (WQEs), to be placed onto the appropriate queues. The channel adapter then executes the work items, so as to communicate with the corresponding QP of the channel adapter at the other end of the link. The IB specification permits the BCA to allocate as many as 16 million ($2^{24}$) QPs, each with a distinct queue pair number (QPN). A given consumer may open and use multiple QPs simultaneously.

Typically, a range of addresses in the memory space of the host is assigned to the HCA for use as "doorbells" by host processes in accessing their allocated QPs. Each QP is associated with a different doorbell, which is mapped into a separate page (typically a 4 KB segment) of the memory space. When a user process wishes to submit a WR to one of its QPs, it writes to the doorbell, which prompts the HCA to service the read or write request. The operating system (OS) on the host processor is responsible for ensuring that each process writes only to the memory pages that are assigned to it. This type of memory protection is standard in all operating systems known in the art. Together with the doorbell assignment, it ensures that each process can access only its own assigned QPs. Since each doorbell consumes a page of memory, however, an enormous virtual memory space is required in order to support the full complement of 16 million QPs provided by the IB standard. It is known in the art to allocate doorbells smaller than a full page, and thus to reduce the memory range required for this purpose, but this mechanism offers at best a partial solution to the problem of supporting a large number of QPs.

SUMMARY OF THE INVENTION

It is an object of some aspects of the present invention to provide improved methods and devices for controlling host access to data network communications.

It is a further object of some aspects of the present invention to provide methods and devices that enable a large number of service instances to be accessed in parallel by host processes while limiting the range of memory space that must be allocated for use as doorbells on the network interface adapter.

In preferred embodiments of the present invention, a network interface adapter allocates multiple network service instances to processes running on a host processor. Typically, in the IB context, the adapter comprises a HCA, and each service instance corresponds to a QP that is allocated to the host process. Each process that is allocated a service instance is assigned a doorbell in an address range of the adapter. When multiple instances are assigned to a single process, the at same doorbell preferably serves for all of the instances (or at least for a group of the instances together), in contrast to solutions known in the art, in which a separate doorbell is assigned for each instance. Each process invokes the service instances that are allocated to it by writing an identifier of the desired service instance, such as the QPN, to its assigned doorbell.

The adapter maintains a service table in memory listing the allocated instances and the respective context for each instance. This table is preferably not accessible to user processes running on the host. The context for each instance includes an indication of the doorbell address that is assigned to the process to which the instance is allocated. When a process attempts to invoke a service instance by writing a service identifier to its assigned doorbell, the adapter checks the table in order to verify that this is the correct doorbell address for the invoked service instance. In other words, the doorbell address itself is used as a protection key, and prevents processes from invoking service instances that do not belong to them.

The present invention thus makes it possible to assign a single doorbell to be used for invoking multiple service instances. Since each doorbell is uniquely assigned to one process, the network interface adapter ensures that when a process writes a service identifier to its assigned doorbell, it can invoke only its own service instances, and not those allocated to other processes. The host OS, meanwhile, ensures that processes on the host will be able to access only their own doorbells. Because many instances can now share a single doorbell, it is possible for the adapter to allocate and serve a substantially unlimited number of service instances without risk of protection faults. In the case of IB networks, the present invention enables the HCA to support the full complement of 16 million QPs called for by the IB specification, while the number of pages in the address range used for HCA doorbells need be no larger than the number of processes allowed to run on the host.

There is therefore provided, in accordance with a preferred embodiment of the present invention, a method for controlling access by processes running on a host device to a communication network, the method including:

assigning to each of the processes a respective doorbell address on a network interface adapter that couples the host device to the network;

allocating a plurality of instances of a communication service on the network, to be provided via the adapter, to at least some of the processes on the host device, such that each of the instances is allocated to a particular one of the processes;

receiving a request submitted by a given one of the processes to its respective doorbell address, to access one of the allocated service instances, which is specified in the request; and conveying data over the network using the specified instance of the service, subject to verifying, based on the doorbell address to which the request was submitted, that the specified instance was allocated to the given process.

Preferably, assigning the respective doorbell address includes assigning a single page in an address space of the host device to each of the processes for use thereby as the respective doorbell. Further preferably, allocating the instances includes allocating multiple instances to a single one of the processes, and conveying the data includes verifying that the specified service instance is one of the multiple instances allocated to the single one of the processes.

Preferably, allocating the instances includes recording a context of each of the instances in a table accessible to the network interface adapter, the context in the table indicating the respective doorbell address of the process to which each of the instances is allocated, and conveying the data includes verifying that the doorbell address to which the request was submitted matches the doorbell address indicated by the table for the specified instance. Most preferably, recording the context includes maintaining the table in a memory accessible to the host device, while preventing access by the processes to the table. Further preferably, the context further includes at least a destination address and service type for each of the instances.

Preferably, assigning the respective doorbell address includes assigning the address using an operating system running on the host device, and receiving the request includes receiving the request by the given process to write to its respective doorbell address by means of the operating system, which permits each of the processes to write only to its own assigned doorbell address.

In a preferred embodiment, the communication service includes a transport service. Preferably, allocating the plurality of the instances includes allocating pairs of work queues, and receiving the request includes receiving a work request to place a work item in a specified one of the work queues, and conveying the data includes transporting the data to a destination address provided by a context of the specified work queue.

There is also provided, in accordance with a preferred embodiment of the present invention, a method for controlling access by a process on a host device to a communication network, the method including:

allocating to the process a plurality of pairs of work queues on a channel adapter that couples the host device to the network, for use by the process in sending and receiving communications over the network;

assigning to the process a single doorbell address on the adapter for use in accessing any of the plurality of the pairs of work queues;

receiving a work request submitted by the process to the doorbell address to place a work item in one of the allocated queues that is specified in the request; and transporting data over the network responsive to the work request.

Preferably, transporting the data includes verifying, based on the doorbell address to which the request was submitted, that the queue specified in the request was allocated to the process.

Further preferably, allocating the plurality of pairs of work queues includes allocating the pairs of work queues to multiple processes on the host device, such that each of the pairs is allocated to a particular one of the processes, and assigning the single doorbell address includes assigning multiple, respective doorbell addresses to the multiple processes.

There is additionally provided, in accordance with a preferred embodiment of the present invention, a network interface adapter, for coupling a host device to a communication network, the adapter including:

a range of doorbell addresses in an address space of the host device, such that each of a plurality of processes running on the host device is assigned a respective doorbell address within the range; and a controller, which is arranged to allocate a plurality of instances of a communication service provided by the adapter on the network to at least some of the processes on the host device, such that each of the instances is allocated to a particular one of the processes, and which is further arranged, when the adapter receives a request submitted by a given one of the processes to its respective doorbell address to access one of the allocated service instances specified in the request, to verify, based on the doorbell address to which the request was submitted, that the specified instance was allocated to the given process before allowing the adapter, in response to the request, to convey data over the network using the specified instance of the service.

There is further provided, in accordance with a preferred embodiment of the present invention, a channel adapter for coupling a host device to a communication network, the adapter including:

a plurality of pairs of work queues, for allocation to a process on the host device for use in sending and receiving communications over the network; and a single doorbell address in an address space of the host device, for assignment to the process for use in accessing any of the plurality of the pairs of work queues, so that in response to a work request submitted by the process to the single doorbell address to place a work item in one of the allocated queues that is specified in the request, data are transported over the network by the adapter.

Preferably, the adapter includes a controller, which is arranged to verify, based on the doorbell address to which the request was submitted, that the queue specified in the request was allocated to the process before allowing the data to be transported by the adapter. Additionally or alternatively, the controller is arranged to record a context of each of the pairs in a table accessible to the channel adapter, the context in the table indicating the respective doorbell address of the process to which each of the pairs is allocated, and to verify that the doorbell address to which the request was submitted matches the doorbell address indicated by the table for the specified queue before allowing the data to be transported by the adapter.

The present invention will be more fully understood from the following detailed description of the preferred embodiments thereof, taken together with the drawings in which:

BRIEF DESCRIPTION OF THE DRAWINGS

FIG. 2 is a flow chart that schematically illustrates a method for controlling access to QPs on a HCA by process running on a host, in accordance with a preferred embodiment of the present invention.

DETAILED DESCRIPTION OF A PREFERRED EMBODIMENT

Figure 1:
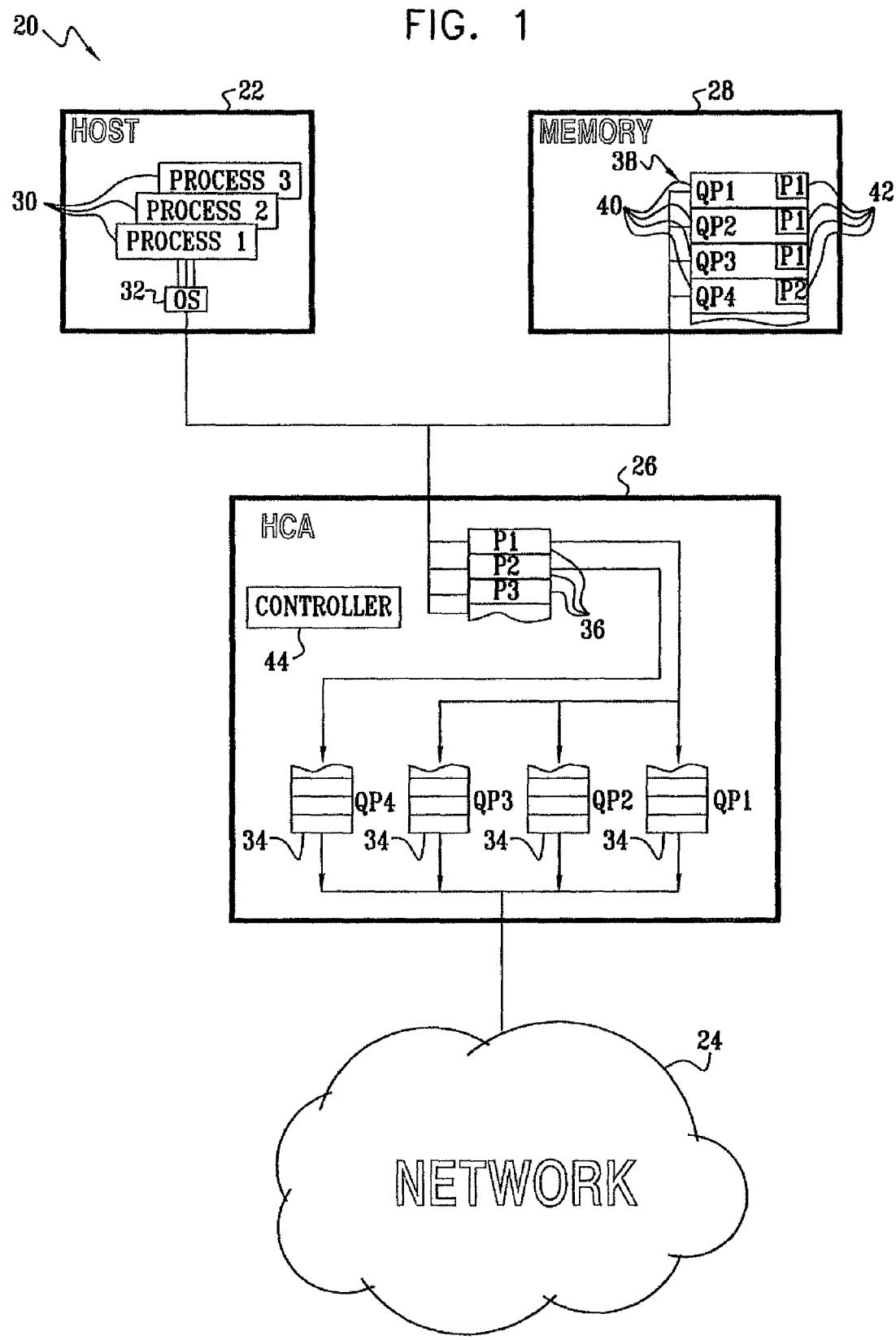
FIG. 1 is a block diagram that schematically illustrates a computer network communication system, in accordance with a preferred embodiment of the present invention.

FIG. 1 is a block diagram that schematically illustrates an IB network communication system 20, in accordance with a preferred embodiment of the present invention. In system 20, a host processor 22 is connected to an IB network 24 by a HCA 26. Typically, processor 22 comprises an Intel Pentium™ processor or other general-purpose computing device with suitable software. Host 22 and HCA 26 are connected to a memory 28 via a suitable bus, such as a Peripheral Component Interface (PCI) bus, as is known in the art, wherein the HCA and memory occupy certain ranges of physical addresses in a defined address space of host 22.

Typically, multiple processes 30 run simultaneously on host 22. Processes 30 are labeled arbitrarily as "PROCESS 1," "PROCESS 2" and "PROCESS 3." An OS 32, such as Unix™ or Microsoft Windows™, controls access by processes 30 to system resources, such as HCA 26 and memory 28. In particular, the OS is assumed to have memory mapping and allocation facilities, as are known in the art, by means of which the physical address ranges of HCA 26 and memory 28 are mapped to virtual addresses to be accessed by processes 30, and each process is assigned certain pages of virtual memory for its use. When one of processes 30 attempts to read from or write to a given virtual address in its assigned page range, OS 32 translates the virtual address to the proper physical address and ascertains that the process has the correct permissions to access this address. If it does not, the OS returns a page fault.

In accordance with the IB specification, processes 30 access transport services on network 24 via send and receive queues of QPs 34 in a suitable memory buffer of HCA 26. Multiple QPs may be allocated to each process. In the present example, QP1, QP2 and QP3 are allocated to PROCESS 1, while QP 4 is allocated to PROCESS 2. In actual operation, there may be tens, hundreds or even more QPs allocated to each process, up to a total of 16 million QPs served by HCA 26. To place work items (WQEs) on their allocated queues, processes 30 ring respective doorbells 36 on HCA 26, by writing to the appropriate doorbell addresses that are assigned within the address range occupied by the RCA. As shown in FIG. 1, each process 30 has a single doorbell page (labeled P1, P2, P3 to correspond to PROCESS 1, PROCESS 2 and PROCESS 3, respectively), even though in the case of PROCESS 1, this doorbell page can be used to access multiple QPs 34. The novel mechanism by which a single doorbell page is used to access multiple QPs is described in greater detail hereinbelow.

An embedded controller 44 in HCA 26 maintains a QP context table 38 in memory 28, with an entry 40 for each allocated QP. Table 38 is preferably protected by an address translation and protection mechanism provided by the CPU, as is known in the art, so that user applications cannot access the table. Alternatively, the table may be maintained in a dedicated memory of HCA 26. Each entry 40 contains service information regarding the respective QP, such as the service type and options, addressing vector and queue status. In addition, each entry comprises a user page field 42, identifying the doorbell page that is assigned to the process to which this QP is allocated. Field 42 may comprise the actual address of the assigned doorbell page, or alternatively, it may indicate the address in some coded form, as is known in the art. In the example of FIG. 1, entries 40 for QP1, QP2 and QP3 all have P1 in field 42, identifying the doorbell page of PROCESS 1, while the entry for QP4 has P2 in field 42.

FIG. 2 is a flow chart that schematically illustrates a method for controlling access by processes 30 to QPs 34, in accordance with a preferred embodiment of the present invention. This method is described, for the sake of clarity, with reference to the hardware configuration shown in FIG. 1. It will be apparent to those skilled in the art, however, that the principles of this method may similarly be implemented in other hardware environments, as are known in the art of digital network communications.

The method of FIG. 2 is initiated when one of processes 30 on host 22 asks for allocation of a new QP 34 on HCA 26, at a QP allocation step 50. HCA driver software running at a privilege level of OS 32 checks to determine whether this process has already been assigned a doorbell page on HCA 26, at a doorbell checking step 52. If there is not yet a doorbell assigned for this process, the next free doorbell 36 on the HCA is assigned to the process, at a doorbell assignment step 54. Alternatively, the doorbell page may be assigned to the process in advance, before allocation of QPs begins. On the other hand, if a doorbell page has already been assigned to this process, the previously-assigned doorbell is used for the new QP, as well, at a previous assignment step 56. In consequence, the same doorbell is used for multiple QPs that are allocated to a single process. This situation is exemplified in FIG. 1 by QP1, QP2 and QP3, which are allocated to PROCESS 1 and are all accessed via doorbell page P1.

In response to the request from process 30 at step 50, OS 32 allocates a new QP 34 and creates a corresponding new entry 40 in QP table 38, at an entry creation step 58. The new entry contains the identity of the doorbell page assigned to the process in field 42. The OS returns the OP number (QPN) of the allocated QP to process 30 via OS 32, at a return step 60.

After receiving the allocated QPN, process 30 prepares one or more work requests (WRs) in the form of descriptors that it writes to memory 28. The descriptors typically specify the type of read or write operation HCA 26 is to perform and the address range in memory 28 from which data are to be read or to which data are to be written. The descriptors are preferably prepared and executed in the form of a linked list, as described in a U.S. patent application entitled "DMA Doorbell," filed May 31, 2001, which is assigned to the assignee of the present patent application and whose disclosure is incorporated herein by reference. After the process has prepared the WRs, it causes a service request to be written to its assigned doorbell page 36, at a doorbell ringing step 62. Since multiple QPs can be accessed through the same doorbell page, the service request specifies the QPN, as well as the address in memory 28 at which the first descriptor can be found.

Controller 44 in HCA 36 looks up the context of the specified QPN in table 38, at a context checking step 64. Specifically, the controller checks the contents of field 42 in the table entry corresponding to the specified QPN, in order to verify that the address of the doorbell that the process rang (i.e., doorbell page 36 to which the service request was written) is the same as the address registered in field 42 for this QPN. If the addresses match, HCA 36 proceeds to read the descriptor from the specified location in memory 28, and places a corresponding WQE in the appropriate send or receive queue of the specified QP 34, at a work preparation step 66. When the WQE reaches the head of the queue, it is serviced by the HCA, at a service step 68, causing the HCA to send or receive the specified data.

On the other hand, it may be that the address of the doorbell rung by the process does not match the address in field 42 for the specified QPN. Although OS 32 allows each process 30 to write only to its own, assigned doorbell page 36, the OS cannot prevent the process from specifying, in the service request that it writes to its doorbell, the number of a QP that is allocated to a different process. In other words, PROCESS 1 could attempt to submit a service request for QP4 via its P1 doorbell. Such improper QP invocation may be either accidental or malicious. In the event that controller 44 discovers a mismatch between the doorbell address and the address in field 42, the HCA will not carry out the service request. Instead, it drops the request without executing it, at a failure step 70.

Although preferred embodiments are described hereinabove with particular reference to QPs allocated on a HCA in an IB network, the principles of the present invention are similarly applicable to other types of network services and protocols, as well as to networks and network adapters of other types, such as Internet Protocol (IP) networks and adapters. Thus, for example, in alternative embodiments of the present invention (not shown in the figures), the doorbell addresses assigned to different processes may be used to control access to ports allocated for other transport-layer services, such as Transport Control Protocol (TCP) and User Datagram Protocol (UDP) services. The doorbell address can also be used as a protection key for network-layer services, such as IP service, and data link services, such as Ethernet service.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for controlling access by processes running on a host device to a communication network, the method comprising:
   allocating a plurality of instances of a communication service on the network, by a driver of the network interface adapter that couples the host device to the network, to be provided via the adapter, to at least some of the processes on the host device, such that each of the instances is allocated to a particular one of the processes, wherein allocating the instances comprises allocating multiple instances to a single one of the processes;
   assigning to each of the processes a single respective doorbell address in an address range, in an address space of the host device, for the each process to submit only thereto requests to access the multiple instances that are allocated to the each process;
   receiving a request submitted by a given one of the processes to its respective doorbell address, by the network interface adapter, to access one of the allocated service instances, which is specified in the request; and
   conveying data over the network using the specified instance of the service, subject to verifying, based on the doorbell address to which the request was submitted, that the specified instance was allocated to the given process.

2. The method according to claim 1, wherein assigning the respective doorbell address comprises assigning a single page in the address space of the host device to each of the processes for use thereby as the respective doorbell.

3. The method according to claim 1, wherein conveying the data comprises verifying that the specified service instance is one of the multiple instances allocated to the single one of the processes.

4. The method according to claim 1, wherein allocating the instances comprises recording a context of each of the instances in a table accessible to the network interface adapter, the context in the table indicating the respective doorbell address of the process to which each of the instances is allocated, and wherein conveying the data comprises verifying that the doorbell address to which the request was submitted matches the doorbell address indicated by the table for the specified instance.

5. The method according to claim 4, wherein recording the context comprises maintaining the table in a memory accessible to the host device, while preventing access by the processes to the table.

6. The method according to claim 4, wherein the context further comprises at least a destination address and service type for each of the instances.

7. The method according to claim 1, wherein assigning the respective doorbell address comprises assigning the address using an operating system running on the host device, and wherein receiving the request comprises receiving the request by the given process to write to its respective doorbell address by means of the operating system, which permits each of the processes to write only to its own assigned doorbell address.

8. The method according to claim 1, wherein the communication service comprises a transport service.

9. The method according to claim 1, wherein the submission, by each process, to the single respective doorbell address of the each process, of a request to access an instance that is allocated to the each process, includes writing an identifier of the instance to the single respective doorbell address of the each process.

10. A method for controlling access by a process on a host device to a communication network, the method comprising:
    allocating to the process a plurality of pairs of work queues on a channel adapter that couples the host device to the network, for use by the process in sending and receiving communications over the network;
    assigning to the process a single doorbell address, in an address range occupied by the adapter in an address space of the host device, for the process to submit only thereto work requests to access any of the plurality of the pairs of work queues;
    receiving a work request submitted by the process to the doorbell address to place a work item in one of the allocated queues that is specified in the request; and transporting data over the network responsive to the work request, wherein transporting the data comprises verifying, based on the doorbell address to which the request was submitted, that the queue specified in the request was allocated to the process.

11. The method according to claim 10, wherein allocating the pairs of work queues comprises recording a context of each of the pairs in a table accessible to the channel adapter, the context in the table indicating the respective doorbell address of the process to which each of the pairs is allocated, and wherein transporting the data comprises verifying that the doorbell address to which the request was submitted matches the doorbell address indicated by the table for the specified queue.

12. The method accoridng to claim 10, wherein the submission, by the process, to the single doorbell address, of a work request to access one of the pairs of work queues, includes writing an identifier of the one work queue pair to the single doorbell address.

13. A network interface adapter, for coupling a host device to a communication network, the adapter comprising:
- a hardware controller, which is arranged to allocate a plurality of instances of a communication service provided by the adapter on the network to at least some of a plurality of processes running on the host device, such that each of the instances is allocated to a particular one of the processes, wherein multiple instances of the service may be allocated to a single one of the processes; and
- a range of doorbell addresses in an address range occupied by the network interface adapter in an address space of the host device, such that each process of said plurality of processes is assigned a single respective doorbell address within the range, within the range, for submitting only thereto requests to access the multiple instances that are allocated to the each process;
- wherein the hardware controller is further arranged, when the adapter receives a request submitted by a given one of the processes to its respective doorbell address to access one of the allocated service instances specified in the request, to verify, based on the doorbell address to which the request was submitted, that the specified instance was allocated to the given process before allowing the adapter, in response to the request, to convey data over the network using the specified instance of the service; and wherein said hardware controller is arranged to verify that the specified service instance is one of the multiple instances allocated to the single one of the processes.

14. The network interface adapter according to claim 13, wherein the respective doorbell address comprises a single page in the address space of the host device, which is assigned respectively to each of the processes.

15. The network interface adapter according to claim 13, wherein the controller is arranged to record a context of each of the instances in a table, the context in the table indicating the respective doorbell address of the process to which each of the instances is allocated, and to verify that the doorbell address to which the request was submitted matches the doorbell address indicated by the table for the specified instance.

16. The network interface adapter according to claim 15, wherein the table is maintained in a memory accessible to the host device, while the processes are prevented from accessing the table.

17. The network interface adapter according to claim 15, wherein the context further comprises at least a destination address and service type for each of the instances.

18. The network interface adapter according to claim 13, wherein the doorbell address is assigned using an operating system running on the host device, which permits each of the processes to write only to its own assigned doorbell address.

19. The network interface adapter according to claim 13, wherein the communication service comprises a transport service.

20. The network interface adapter according to claim 13, wherein the submission by each process, to the single respective doorbell address of the each process, of a request to access an instance that is allocated to the each process, includes writing an identifier of the instance to the single respective doorbell address of the each process.

21. A channel adapter for coupling a host device to a communication network, the channel adapter comprising:
- a plurality of pairs of work queues, for allocation to a process on the host device for use in sending and receiving communications over the network; and
- a single doorbell address in an address range occupied by the channel adapter in an address space of the host device, for assignment to the process for submitting only thereto work request to access any of the plurality of the pairs of work queues, so that in response to a work request submitted by the process to the single doorbell address to place a work item in one of the allocated queues that is specified in the request, data are transported over the network by the channel adapter;
- wherein the channel adapter comprising a controller, which is arranged to verity, based on the doorbell address to which the request was submitted, that the queue specified in the request was allocated to the process before allowing the data to be transported by said channel adapter.

22. The channel adapter according to claim 21, and comprising a controller, which is arranged to record a context of each of the pairs in a table accessible to the channel adapter, the context in the table indicating the respective doorbell address of the process to which each of the pairs is allocated, and to verify that the doorbell address to which the request was submitted matches the doorbell address indicated by the table for the specified queue before allowing the data to be transported by the adapter.

23. The channel adapter according to claim 21, wherein the submission, by the process, to the single doorbell address, of a work request to access one of the pairs of work queues, includes writing an identifier of the one work queue pair to the single doorbell address.

* * * * *

UNITED STATES PATENT AND TRADEMARK OFFICE
CERTIFICATE OF CORRECTION

| | |
|---|---|
| PATENT NO. | : 7,929,539 B2 |
| APPLICATION NO. | : 12/360119 |
| DATED | : April 19, 2011 |
| INVENTOR(S) | : Michael Kagan et al. |

It is certified that error appears in the above-identified patent and that said Letters Patent is hereby corrected as shown below:

Title Page, Item (75) Inventors, fifth inventor, "Dafna Levenvirth", city of residence "Neit Izhak" should correctly read --Beit Izhak--.

Signed and Sealed this
Twelfth Day of July, 2011

David J. Kappos
*Director of the United States Patent and Trademark Office*